United States Patent
Suda et al.

(10) Patent No.: US 7,479,512 B2
(45) Date of Patent: Jan. 20, 2009

(54) DISPERSION COMPOSITION CONTAINING FUNCTIONAL SUBSTANCE, METHOD OF FORMING IMAGE AND IMAGE FORMING APPARATUS

(75) Inventors: Sakae Suda, Kanagawa (JP); Koichi Sato, Kanagawa (JP); Ikuo Nakazawa, Kanagawa (JP); Masayuki Ikegami, Kanagawa (JP); Keiichiro Tsubaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 706 days.

(21) Appl. No.: 10/931,776

(22) Filed: Sep. 1, 2004

(65) Prior Publication Data

US 2005/0037160 A1 Feb. 17, 2005

Related U.S. Application Data

(63) Continuation of application No. PCT/JP03/02542, filed on Mar. 5, 2003.

(30) Foreign Application Priority Data

| Mar. 6, 2002 | (JP) | 2002-061066 |
| Jun. 11, 2002 | (JP) | 2002-169823 |
| Jun. 11, 2002 | (JP) | 2002-169824 |
| Dec. 16, 2002 | (JP) | 2002-364226 |

(51) Int. Cl.
*C09D 11/00* (2006.01)
(52) U.S. Cl. ...................... 523/160; 523/161
(58) Field of Classification Search ............. 523/160, 523/161
See application file for complete search history.

(56) References Cited

U.S. PATENT DOCUMENTS

| 4,476,210 A | 10/1984 | Croucher et al. |
| 5,272,201 A | 12/1993 | Ma et al. |
| 2002/0032252 A1 | 3/2002 | Ishizuka |

FOREIGN PATENT DOCUMENTS

| CN | 1223276 A | 7/1999 |
| EP | 1285948 | 2/2003 |
| JP | 6-136311 | 5/1994 |
| JP | 10-195152 A | 7/1998 |
| JP | 11-302345 | 11/1999 |
| JP | 2002-97395 | 4/2002 |
| JP | 2002-212447 | 7/2002 |
| JP | 2002-220247 | 8/2002 |
| JP | 2003-119341 | 4/2003 |

OTHER PUBLICATIONS

International Search Reporet dated May 27, 2003.
EPO Supplementary Search Report for corresponding EP 03 70 8484, dated Jul. 14, 2006.
Chinese Office Action for Chinese Patent Application No. 038074532 dated Nov. 17, 2006 (without English translation).
Office Action (Communication pursuant to Article 96(2) EPC) dated Dec. 19, 2006 for an European counterpart application No. 03708484.5-2109.

*Primary Examiner*—Edward J Cain
(74) *Attorney, Agent, or Firm*—Morgan & Finnegan LLP

(57) ABSTRACT

An ink composition in which particles of a functional substance comprising a dye or a pigment included in polymer micelles comprising a block polymer are dispersed in a solvent, wherein the particles have an average particle size of not more than 200 nm and a particle size distribution (index of dispersion degree $\mu/G^2$) of not more than 0.1, a method of forming an image and an image forming apparatus using the same are provided. The main component of the polymer micelle is an amphiphilic block polymer.

16 Claims, 1 Drawing Sheet

FIGURE
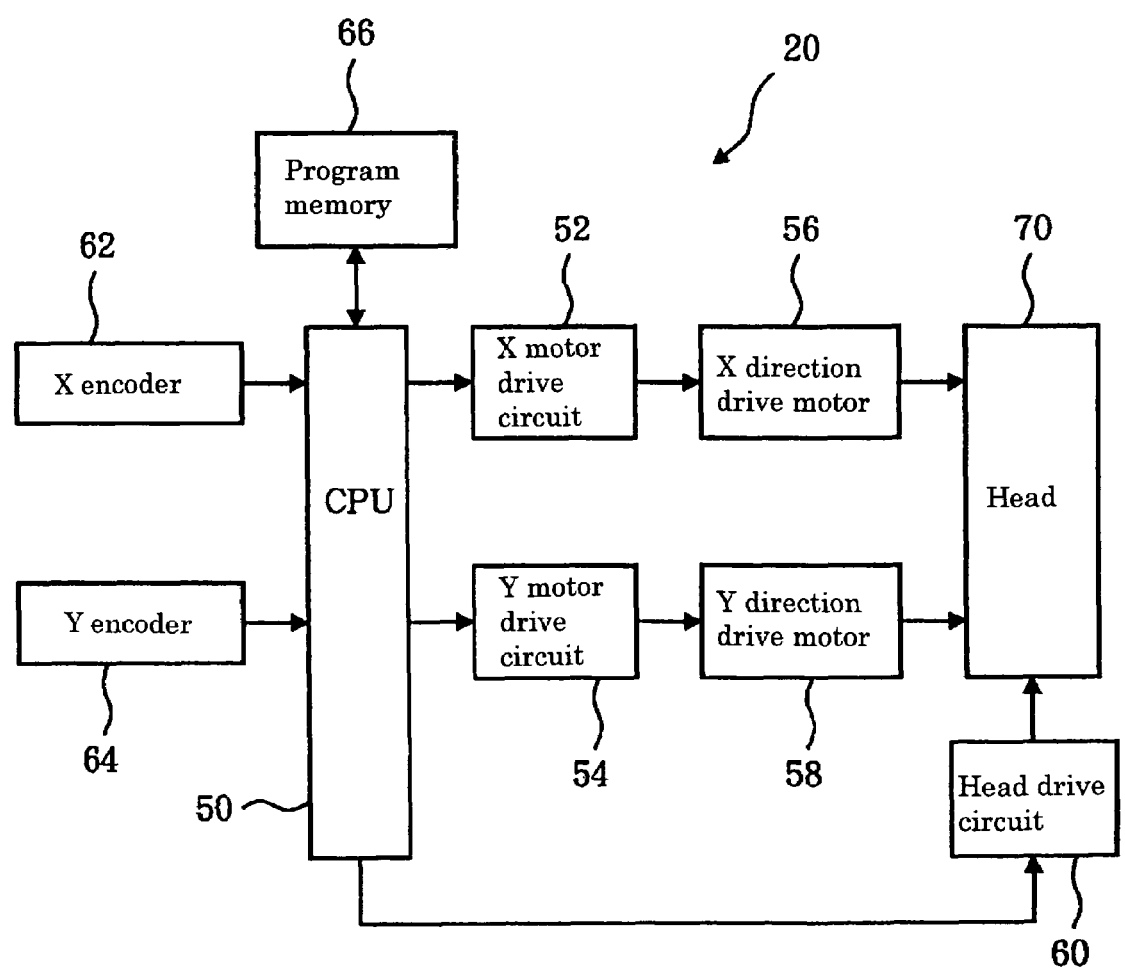

DISPERSION COMPOSITION CONTAINING FUNCTIONAL SUBSTANCE, METHOD OF FORMING IMAGE AND IMAGE FORMING APPARATUS

This is a continuation of co-pending Ser. No. PCT/JP03/02542, filed 5 Mar. 2003, which claims the benefit of Japanese Patent Applications No. 2002-061066, filed Mar. 6, 2002, No. 2002-169823, filed Jun. 11, 2002, No. 2002-169824, filed Jun. 11, 2002 and 2002-364226, filed Dec. 16, 2002.

BACKGROUND OF THE INVENTION

1. Field of the Invention

The present invention relates to a dispersion composition comprising a functional substance and a polymer, which can be used as various functional materials. This invention also relates to an ink composition, a method of forming an image and an image forming apparatus using the same. In particular, the present invention relates to an ink composition which is an image forming material that can be preferably used for a printer or a display, wherein the dispersion composition containing a functional substance is an aqueous dispersion material, a method of forming an image and an image forming apparatus using the same.

2. Related Background Art

Dispersion compositions that contain functional materials have been widely used for agricultural chemicals such as pesticides and insecticides and pharmaceuticals such as antitumor agents, antiallergic agents and antiinflammatory agents. In addition, coloring materials which contain a coloring agent as the functional material, such as ink and toner, are known. Recently, digital printing technology has been developing at a remarkable speed. This technology, represented by electrophotography and ink jet technology, is now becoming more and more important in office and home as an image forming technology.

Of these technologies, the ink jet technology employs a direct printing method, and its major characteristics include compact size and low power consumption. Further, as the nozzles have become finer, higher image quality has been achieved. An example of ink jet technique is a method where ink supplied from an ink tank is heated by a heater provided in a nozzle to form a bubble therein, whereby the ink is ejected to form an image on a recording medium. Another method is ejecting ink from a nozzle by vibrating a piezo-electric device.

Since the ink used in these ink jet methods is usually an aqueous dye solution, blurring may occur when colors are superimposed and a phenomenon called feathering may occur at the printed area of the recording medium along the fibers of paper. To improve this situation, use of pigment dispersion ink has been studied. For example, according to one method, a pigment is dispersed by an ionic block polymer containing at least one hydrophilic component and at least one hydrophobic component (U.S. Pat. No. 5,085,698). However, further improvement is desired in stable and long term dispersion in a solvent by suppressing aggregation due to interaction between particles, as well as in color and color development.

SUMMARY OF THE INVENTION

The present invention has been made in view of the above-mentioned problems in the conventional techniques and aims at providing a dispersion composition containing a functional substance wherein the functional substance is in a good dispersion state in a solvent.

The present invention also aims at providing an ink composition containing a pigment or a dye as a functional substance and water as a solvent, in which the pigment or dye is in a good dispersion state.

In addition, the present invention aims at providing an ink composition for ink jet having high dispersion stability of pigment or dye as a functional substance in a solvent, providing superior color and color development of printed image.

Furthermore, the present invention aims at providing a method of forming an image and an image forming apparatus therefor, using the above-mentioned ink composition.

The above-mentioned problems are solved by the present invention described below.

The first invention of the present invention is a dispersion composition containing a functional substance, wherein the functional substance and a block polymer are dispersed in a solvent in the form of particles, and the particles have an average particle size of not more than 200 nm and a particle size distribution (index of dispersion degree $\mu/G^2$) of not more than 0.2.

In the present invention, it is preferable that particles in the form of polymer micelles comprising the block polymer and including a functional substance are dispersed in a solvent and the particles have an average particle size of not more than 200 nm and a particle size distribution (index of dispersion degree $\mu/G^2$) of not more than 0.2.

The main component of the polymer micelle is preferably an amphiphilic block polymer. The "main component" means that the amphiphilic block polymer accounts for not less than 50 wt %, preferably not less than 70 wt %, more preferably not less than 80 wt % of the micelle forming substances excluding the functional substance in a composition ratio.

The block polymer is preferably a nonionic amphiphilic block polymer.

The block polymer preferably has a repeating structural unit of the following formula (1):

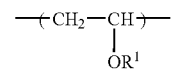

wherein $R^1$ is selected from the group consisting of a linear, branched or cyclic alkyl group having 1 to 18 carbon atoms, Ph, Pyr, Ph-Ph, Ph-Pyr, $-(CH(R^2)-CH(R^3)-O)_p-R^4$ and $-(CH_2)_m-(O)_n-R^4$, in which the hydrogen atom in the aromatic ring is optionally substituted by a linear or branched alkyl group having 1 to 4 carbon atoms and the carbon atom in the aromatic ring is optionally substituted by a nitrogen atom, p is an integer of 1 to 18, m is an integer of 1 to 36, n is 0 or 1, $R^2$ and $R^3$ are each independently a hydrogen atom or $CH_3$, $R^4$ is a hydrogen atom, a linear, branched or cyclic alkyl group having 1 to 18 carbon atoms, Ph, Pyr, Ph-Ph, Ph-Pyr, $-CHO$, $-CO-CH=CH_2$, $-CO-C(CH_3)=CH_2$, or $-CH_2COOR^7$, and when $R^4$ is other than a hydrogen atom, a hydrogen atom bonded to a carbon atom is optionally substituted by a linear or branched alkyl group having 1 to 4 carbon atoms, F, Cl or Br, and the carbon atom in the aromatic ring is optionally substituted by a nitrogen atom, $R^7$ is a hydrogen atom or an alkyl group having 1 to 4 carbon atoms, -Ph is a phenyl group, -Pyr is a pyridyl group, -Ph-Ph is a biphenyl group and -Ph-Pyr is a pyridyl phenyl group.

The block polymer preferably has a repeating structural unit of the following formula (2) as a hydrophilic segment:

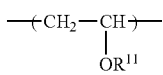

wherein $R^{11}$ is $-(CH(R^2)-CH(R^3)-O)_p-R^{14}$ or $-(CH_2)m-(O)_n-R^{14}$, p is an integer of 1 to 18, m is an integer of 1 to 36, n is 0 or 1, $R^2$ and $R^3$ are each. independently a hydrogen atom or $CH_3$, and $R^{14}$ is a hydrogen atom a linear, branched or cyclic alkyl group having 1 to 5 carbon atoms.

It is preferable that the block polymer has a molecular weight distribution Mw/Mn of not more than 2.0.

It is preferable that the block polymer has a glass transition temperature Tg of not more than 20° C.

It is preferable that the composition has a pH of not less than 5 and the functional substance and a nonionic block polymer are dispersed in a solvent in the form of particles in the presence of a cation. The cation is preferably coordinated with the block polymer.

The above-mentioned functional substance is preferably coloring material and the coloring material is preferably a liquid or solid coloring material, which is a dye or pigment, and the main component of the solvent is preferably water.

The above-mentioned dispersion composition containing a functional substance preferably has responsiveness to stimulation by which the physical property changes.

The stimulation is preferably any of temperature change, exposure to electromagnetic waves, pH change and concentration change.

The above-mentioned dispersion composition containing a functional substance can be prepared as an ink composition.

The ink composition is preferably an ink composition for ink jet.

The second invention of the present invention is a method of forming an image using the above-mentioned ink composition.

The image-forming method preferably comprises the steps of ejecting ink from an ink ejection port and applying the ink on a recording medium to conduct recording.

It is preferable that the ink composition is contacted with a stimulating substance that stimulates the ink composition, whereby the ink composition is fixed on a recording medium to form an image.

The stimulating substance is preferably provided on the recording medium in advance.

The ink is preferably ejected from the ink ejection port by applying thermal energy to the ink.

The third invention of the present invention is an image recording apparatus used for the above-mentioned method of forming image.

The fourth invention of the present invention is a recording medium used for the above-mentioned method of forming an image wherein the ink composition is applied by ejecting from an ink ejection port, and a stimulating substance which stimulates the ink composition is provided to the recording medium in advance.

BRIEF DESCRIPTION OF THE DRAWINGS

Figure is a diagram illustrating a mechanism of the image recording apparatus of the present invention.

DETAILED DESCRIPTION OF THE PREFERRED EMBODIMENTS

In the following, preferable embodiments of the present invention are described referring to the Figure.

In the dispersion composition containing a functional substance of the present invention, a functional substance and a block polymer are dispersed in a solvent in the form of particles, and the particles have an average particle size of not more than 200 nm and a particle size distribution (index of dispersion degree $\mu/G^2$) of not more than 0.2.

The functional substance contained in the composition of the present invention has a specific function and is in the form of, for example, a compound, mixture, solid, liquid or other forms. Examples thereof include substances that can be used for agricultural chemicals such as pesticides and insecticides, substances that can be used for pharmaceuticals such as antitumor agents, antiallergic agents and antiinflammatory agents, substances that can be used for cosmetics such as a lipstick, foundation, blusher, moisturizing cream, coloring materials such as dye, pigment and a color pigment and a composition thereof. In the present invention, coloring materials such as dye, pigment and color pigment are preferably used.

In the present invention, the functional substance and the block polymer are dispersed in a solvent in the form of particles. These particles dispersed in the solvent include particles made of the functional substance alone, particles made of the functional substance adsorbed to the hydrophilic part of the block polymer, particles of the functional substance encapsulated in the block polymer, and particles made of the block polymer alone. The entire functional substance having a specific function is preferably encapsulated in the block polymer. As the form of inclusion of the functional substance in the block polymer, inclusion of the functional substance in the polymer micelle of the block polymer is preferable.

The content of the functional substance having a specific function which is contained in the dispersion composition of the present invention is not less than 0.1 wt % and not more than 70 wt %, preferably not less than 0.5 wt % and not more than 50 wt %, more preferably not less than 1 wt % and not more than 30 wt %. When the content is less than 0.1 wt %, the specific function may not be exhibited and when the content is more than 70 wt %, the viscosity of the composition tends to be too high.

In the dispersion composition of the present invention, the functional substance is dispersed in a solvent in the form of particles preferably included in the polymer micelle of a block polymer and the particles have an average particle size of not more than 200 nm and a particle size distribution (index of dispersion degree $\mu/G^2$) of not more than 0.1. Here, an amphiphilic block polymer is preferably used, which is capable of forming a polymer micelle and includes the functional substance in the micelle.

When the functional dispersion composition of the present invention is used for an ink composition, dispersion stability of coloring material dispersion ink, coloring ability and brightness of the color are greatly influenced by the particle size and uniformity in particle size of the dispersion particles. In other words, when the particle size of the particles dispersed in a solvent is large, particles aggregate and stable dispersion cannot be achieved. Further, since the particle size is inversely proportional to the coloring ability (Annalen der Physik, vol.25, p.377, 1908), the coloring ability is lowered when the particle size is large. Therefore, the average particle size of the particle in the present invention is not more than 200 nm, preferably not more than 150 nm, more preferably not more than 100 nm, particularly preferably not more than 70 nm, or not more than 50 nm. When the particle size of the dispersion particles is not uniform and has a wide distribution, brightness of the color is deteriorated. Therefore, the particle size distribution (index of dispersion degree $\mu/G^2$) of the particles is not more than 0.1, preferably not more than 0.05, more preferably not more than 0.01.

The composition of the present invention is designed to achieve stable particle dispersion and improvement of coloring ability and color brightness, and contains dispersion particles of which aggregation is suppressed, a small particle size and a narrow particle distribution. Here, the value twice the Stokes' radius, i.e., the diameter, is defined as the average particle size. The Stokes' radius can be determined by a correlational method, ultrasonic attenuation spectroscopy and the like. In the present invention, measurement by a dynamic light scattering method, which is a photon correlational method, is mainly employed. As the index of the uniformity of the particle size, the index of dispersion degree ($\mu/G^2$, $\mu$: quadratic coefficient of cumulant expansion, G: attenuation constant) indicated by Gulari et al is generally used (The Journal of Chemical Physics, vol.70, p.3965, 1979). This value is also calculated by a dynamic light scattering method. As a particle size measurement device using the dynamic light scattering method, DLS7000 made by Otsuka Electronics Co., Ltd. can be mentioned.

A block polymer is used in the present invention. An amphiphilic block polymer, which is particularly preferably used in the present invention, can form a polymer micelle of about 100 nm, allowing dispersion or inclusion of functional substances in the core.

Specific examples of the block polymer usable in the present invention are known block polymers such as acrylic or methacrylic block polymers, block polymers obtained by addition polymerization or condensation polymerization of polystyrene and others and block polymers containing a polyoxyethylene or polyoxyalkylene block.

In the present invention, a block polymer containing a poly(vinyl ether) structure is preferably used. The block polymer in the present invention may be a graft polymer containing a poly(vinyl ether) structure or may contain a copolymerized segment or graduation segment.

The block polymer containing a poly(vinyl ether) structure preferably used in the present invention is described. A number of processes have been proposed for production of polymers containing a poly(vinyl ether) structure (Japanese Patent Application Laid-Open No.H11-080221). Representative one is cation living polymerization proposed by Aoshima et al. (Japanese Patent Application Laid-Open No. H11-322942, Japanese Patent Application Laid-Open No. H11-322866). Cation living polymerization can produce various polymers with a precise length (molecular weight), and these polymers include homopolymers, copolymers comprised of 2 or more monomer components, block polymers, graft polymers and graduation polymers. Various functional groups can be introduced to the side chains of polyvinyl ether. Alternatively, a cation polymerization process can be carried out using $HI/I_2$ or $HCl/SnCl_4$.

The polymer containing a poly(vinyl ether) structure may be a copolymer of vinyl ether and another polymer. In order to improve dispersion stability and coloring ability and to exhibit a bright color, the copolymer needs to be a block polymer or may be a graft polymer.

In the present invention, the block polymer is more preferably in the form of AB, ABA, ABC and the like. Each of A, B and C represents a different block segment. A typical example of AB block polymer is a block polymer where A is a segment comprising any repeating structural unit represented by the formula (I) and B is a segment comprising a repeating structural unit represented by the formula (I) but differing from the repeating structural unit of A. Similarly, a typical example of ABC block polymer is a block polymer where A is a segment comprising any repeating structural unit represented by the formula (I), B is a segment comprising a repeating structural unit represented by the formula (I) but differing from the repeating structural unit of A, and C is a segment comprising a repeating structural unit represented by the formula (I) but neither the repeating structural units of A or B. Segments A, B and C may be comprised of a single repeating structural unit and the structural unit differing each other or comprised of the same plural repeating structural units but with different copolymerization ratios.

In the above block polymer containing a poly(vinyl ether) structure, more specifically, the repeating structural unit of the poly(vinyl ether) structure is preferably a structural unit represented by the following formula (1):

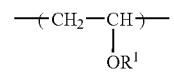

In the formula (1), $R^1$ is selected from the group consisting of a linear, branched or cyclic alkyl group having 1 to 18 carbon atoms, Ph, Pyr, Ph-Ph, Ph-Pyr, $—(CH(R_2)—CH(R^3)—O)_p—R^4$ and $—(CH_2)_m—(O)_n—R_4$. The hydrogen atom in the aromatic ring is optionally substituted by a linear or branched alkyl group having 1 to 4 carbon atoms and the carbon atom in the aromatic ring is optionally substituted by a nitrogen atom; p is an integer of 1 to 18, m is an integer of 1 to 36, n is 0 or 1, each of $R^2$ and $R^3$ is independently a hydrogen atom or $CH_3$; $R^4$ is a hydrogen atom, a linear, branched or cyclic alkyl group having 1 to 18 carbon atoms, Ph, Pyr, Ph-Ph, Ph-Pyr, $—CHO$, $—CO—CH=CH_2$, $—CO—C(CH_3)=CH_2$ or $—CH_2COOR^7$, and when $R^4$ is other than a hydrogen atom, a hydrogen atom bonded to a carbon atom is optionally substituted by a linear or branched alkyl group having 1 to 4 carbon atoms, F, Cl or Br, and the carbon atom in the aromatic ring is optionally substituted by a nitrogen atom, and $R^7$ is a hydrogen atom or an alkyl group having 1 to 4 carbon atoms.

In the present invention, -Ph represents a phenyl group, Pyr represents a pyridyl group, -Ph-Ph represents a biphenyl group and -Ph-Pyr represents a pyridyl phenyl group. Any possible positional isomers for pyridyl, biphenyl and pyridyl phenyl groups are also available.

The amphiphilic block polymer preferably used in the present invention can be obtained by, for example, synthesizing by selecting a hydrophobic block segment and a hydrophilic block segment from the repeating structural units of the above-mentioned formula (1).

A more preferable example of the amphiphilic block polymer used in the present invention is an amphiphilic block polymer containing, as a hydrophilic segment, a block segment containing a repeating structural unit of the following formula (2):

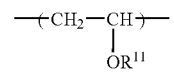

In the formula (2), $R^{11}$ is $-(CH(R^2)-CH(R^3)-O)_p-R^{14}$ or $-(CH_2)m-(O)_n-R^{14}$. p is an integer of 1 to 18, m is an integer of 1 to 36, n is 0 or 1.

$R^2$ and $R^3$ are each independently a hydrogen atom or $CH_3$, and $R^{14}$ is a hydrogen atom or an alkyl group having 1 to 5 carbon atoms.

Next, the structure of vinyl ether monomer is exemplified as the repeating structural unit of the poly(vinyl ether) structure of the block polymer, but the poly(vinyl ether) structure used in the present invention is not limited thereto.

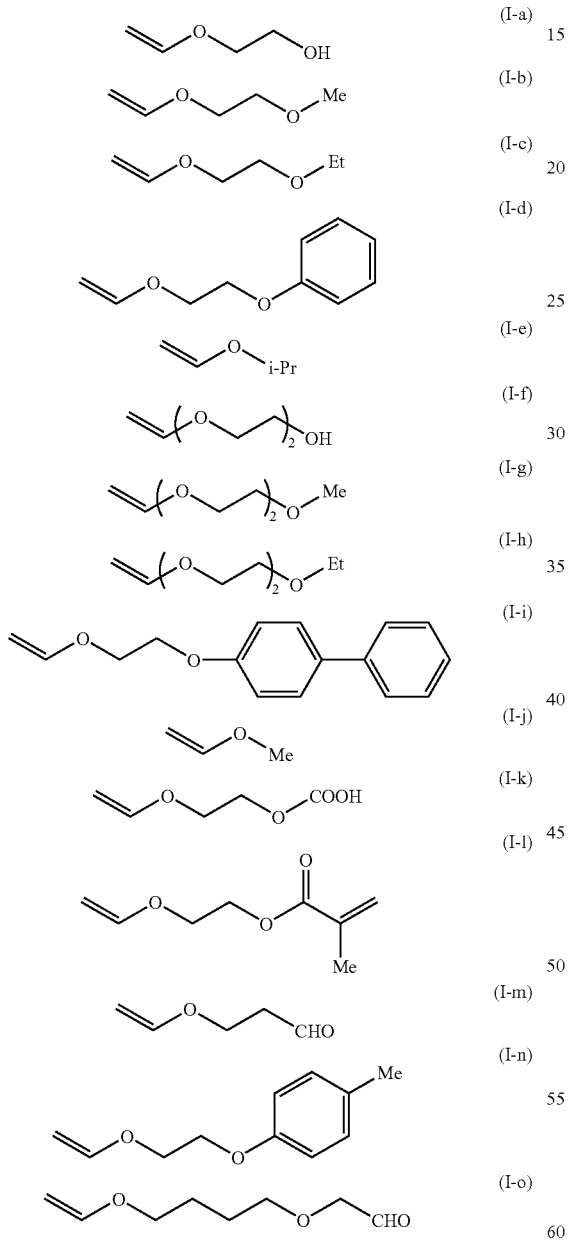

In the formula, Me represents a methyl group, Et represents an ethyl group and i-Pr represents an isopropyl group.

Hereinafter, the structure of poly(vinyl ether) comprising the above vinyl ether monomer is exemplified, but the polymer used in the present invention is not limited thereto.

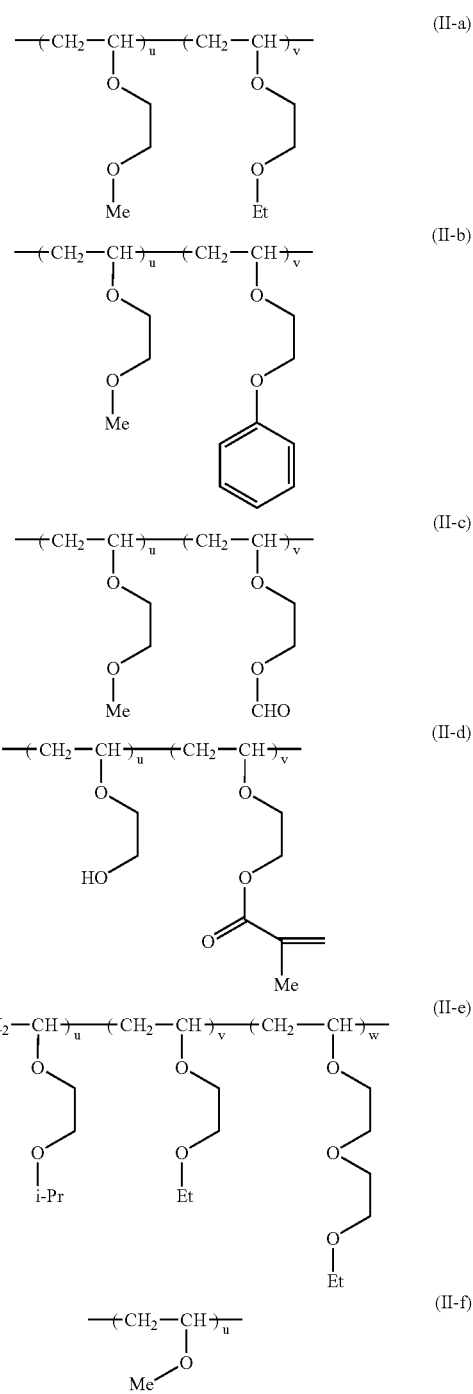

In the poly(vinyl ether) shown above, the number of repeating unit, which is u, v and w, is preferably not less than 1 and not more than 10,000, independently, and the sum (u+v+w) is more preferably not less than 10 and not more than 20,000.

The content of the block polymer contained in the dispersion composition containing a functional substance of the present invention is preferably 0.1 to 50 wt %. When the content of the block polymer is less than 0.1 wt%, dispersibility is decreased and when the content exceeds 50 wt %, the viscosity tends to be too high. A more preferable range is 0.5 wt % to 30 wt %.

The molecular weight distribution of the block polymer used in the present invention, Mw (weight average molecular weight)/Mn (number average molecular weight), is preferably not more than 2.0, more preferably not more than 1.6, further preferably not more than 1.3, and particularly preferably not more than 1.2. The number average molecular weight of the block polymer used in the present invention is preferably 1,000 to 300,000, more preferably not less than 5,000 and not more than 50,000. When the number average molecular weight is less than 1,000 or more than 300,000, the substance having a specific function may not be dispersed well in a solvent.

To improve dispersion stability and inclusion property, the block polymer preferably has more flexible molecular motion because the block polymer can physically entangle with the surface of the functional substance and have an increased affinity. To this end, the glass transition temperature Tg of the main chain of the block polymer is preferably not more than 20° C., more preferably not more than 0° C., further preferably not more than -20° C. The block polymer containing a poly(vinyl ether) structure is preferably used in this regard as well, because it generally has a low glass transition temperature and is flexible.

The solvent in the dispersion composition containing a functional substance of the present invention, in which the particles are dispersed, can be an organic solvents such as various linear, branched or cyclic aliphatic hydrocarbons, aromatic hydrocarbons and heteroaromatic hydrocarbons, organic solvents such as ethers and esters, an aqueous solvent or water.

The content of the solvent contained in the composition of the present invention is preferably 5 to 99 wt %, more preferably 10 to 90 wt %.

A composition containing a coloring material such as a dye, pigment and color pigment as the functional substance of the present invention is preferably used as an ink composition.

The ink composition of the present invention is described below.

In the following, concrete examples of dyes, organic pigments and inorganic pigments used in the present invention are described.

The dye to be used in the present invention may be known ones, and water-soluble dyes such as direct dyes, acid dyes, basic dyes, reactive dyes, and food dyes, and water-insoluble colorants such as disperse dyes can be used.

Examples of oil soluble dyes are C. I. Solvent Blue, -33, -38, -42, -45, -53, -65, -67, -70, -104, -114, -115, -135;

C. I. Solvent Red, -25, -31, -86, -92, -97, -118, -132, -160, -186, -187, -219;

C. I. Solvent Yellow, -1, -49, -62, -74, -79, -82, -83, -89, -90, -120-121, -151, -153 and -154.

Examples of water-soluble dyes are direct dyes such as C. I. Direct Black, -17, -19, -22, -32, -38, -51, -62, -71, -108, -146, -154;

C. I. Direct Yellow, -12, -24, -26, -44, -86, -87, -98, -100, -130, -142;

C. I. Direct Red, -1, -4, -13, -17, -23, -28, -31, -62, -79, -81, -83, -89, -227, -240, -242, -243;

C. I. Direct Blue, -6, -22, -25, -71, -78, -86, -90, -106, -199;

C. I. Direct Orange, -34, -39, -44, -46, -60;

C. I. Direct Violet, -47, -48;

C. I. Direct Brown, -109 and

C. I. Direct Green, -59;

acid dyes such as C. I. Acid Black, -2, -7, -24, -26, -31, -52, -63, -112, -118, -168, -172, -208;

C. I. Acid Yellow, -11, -17, -23, -25, -29, -42, -49, -61, -71;

C. I. Acid Red, -1, -6, -8, -32, -37, -51, -52, -80, -85, -87, -92, -94, -115, -180, -254, -256, -289, -315, -317;

C. I. Acid Blue, -9, -22, -40, -59, -93, -102, -104, -113, -117, -120, -167, -229, -234, -254;

C. I. Acid Orange, -7, -19; and

C. I. Acid Violet, -49;

reactive dyes such as C. I. Reactive Black, -1, -5, -8, -13, -14, -23, -31, -34, -39;

C. I. Reactive Yellow, -2, -3, -13, -15, -17, -18, -23, -24, -37, -42, -57, -58, -64, -75, -76, -77, -79, -81, -84, -85, -87, -88, -91, -92, -93, -95, -102, -111, -115, -116, -130, -131, -132, -133, -135, -137, -139, -140, -142, -143, -144, -145, -146, -147, -148, -151, -162, -163;

C. I. Reactive Red, -3, -13, -16, -21, -22, -23, -24, -29, -31, -33, -35, -45, -49, -55, -63, -85, -106, -109, -111, -112, -113, -114, -118, -126, -128, -130, -131, -141, -151, -170, -171, -174, -176, -177, -183, -184, -186, -187, -188, -190, -193, -194, -195, -196, -200, -201, -202, -204, -206, -218, -221;

C. I. Reactive Blue, -2, -3, -5, -8, -10, -13, -14, -15, -18, -19, -21, -25, -27, -28, -38, -39, -40, -41, -49, -52, -63, -71, -72, -74, -75, -77, -78, -79, -89, -100, -101, -104, -105, -119, -122, -147, -158, -160, -162, -166, -169, -170, -171, -172, -173, -174, -176, -179, -184, -190, -191, -194, -195, -198, -204, -211, -216, -217;

C. I. Reactive Orange, -5, -7, -11, -12, -13, -15, -16, -35, -45, -46, -56, -62, -70, -72, -74, -82, -84, -87, -91, -92, -93, -95, -97, -99;

C. I. Reactive Violet, -1, -4, -5, -6, -22, -24, -33, -36, -38;

C. I. Reactive Green, -5, -8, -12, -15, -19, -23; and

C. I. Reactive Brown, -2, -7, -8, -9, -11, -16, -17, -18, -21, -24, -26, -31, -32, -33;

C. I. Basic Black, -2,

C. I. Basic Red, -1, -2, -9, -12, -13, -14, -27;

C. I. Basic Blue, -1, -3, -5, -7, -9, -24, -25, -26, -28, -29;

C. I. Basic Violet, -7, -14, -27; and

C. I. Food Black, -1, -2.

The above-mentioned examples of coloring materials are particularly preferable for the ink composition of the present invention, but the coloring materials to be used for the ink composition of the present invention are not particularly limited to the-above coloring materials.

In the present invention, pigment and dye can be used together.

The amount of the dye to be used for the ink composition of the present invention is preferably 0.1 to 50 wt % relative to the weight of the ink. When the amount of the dye is less than 0.1 wt %, sufficient image density may not be obtained and when the amount exceeds 50 wt %, the viscosity tends to be too high. A more preferable range is 0.5 wt % to 30 wt %.

The pigment may be either organic or inorganic and the pigment used for the ink is preferably black pigment and three primary colors of cyan, magenta and yellow. Pigments of other colors, colorless or pale color pigments, and metalescent pigments may also be used. In the present invention, commercially available pigments or newly synthesized pigments may also be used.

In the following, commercially available pigments of black, cyan, magenta and yellow are exemplified.

Examples of black pigments are Raven 1060, Raven 1080, Raven 1170, Raven 1200, Raven 1250, Raven 1255, Raven 1500, Raven 2000, Raven 3500, Raven 5250, Raven 5750, Raven 7000, Raven 500ULTRAII Raven 1190ULTRAII (available from Colombian Carbon), Black Pearls L, MOGUL-L, Regal 400R, Regal 660R, Regal 330R, Monarch 800, Monarch 880, Monarch 900, Monarch 1000, Monarch 1300, Monarch 1400 (available from Cabot), Color Black FW1, Color Black FW2, Color Black FW200, Color Black 18, Color Black S160, Color Black S170, Special Black 4, Special Black 4A, Special Black 6, Printex 35, Printex U, Printex 140U, Printex V, Printex 140V (available from Degussa) and No. 25, No. 33, No. 40, No. 47, No. 52, No. 900, No. 2300, MCF-88, MA600, MA7, MA8, MA 100 (available from Mitsubishi Chemical), but not limited these.

Examples of cyan pigments are C. I. Pigment Blue-1, C. I. Pigment Blue-2, C. I. Pigment Blue-3, C. I. Pigment Blue-15, C. I. Pigment Blue-15:2, C. I. Pigment Blue-15:3, C. I. Pigment Blue-15:4, C. I. Pigment Blue-16, C. I. Pigment Blue-22 and C. I. Pigment Blue-60, but not limited these.

Examples of magenta pigments are C. I. Pigment Red-5, C. I. Pigment Red-7, C. I. Pigment Red-12, C. I. Pigment Red-48, C. I. Pigment Red-48:1, C. I. Pigment Red-57, C. I. Pigment Red-112, C. I. Pigment Red-122, C. I. Pigment Red-123, C. I. Pigment Red-146, C. I. Pigment Red-168, C. I. Pigment Red-184, C. I. Pigment Red-202 and C. I. Pigment Red-207, but not limited these.

Examples of yellow pigments are C. I. Pigment Yellow-12, C. I. Pigment Yellow-13, C. I. Pigment Yellow-14, C. I. Pigment Yellow-16, C. I. Pigment Yellow-17, C. I. Pigment Yellow-74, C. I. Pigment Yellow-83, C. I. Pigment Yellow-93, C. I. Pigment Yellow-95, C. I. Pigment Yellow-97, C. I. Pigment Yellow-98, C. I. Pigment Yellow-114, C. I. Pigment Yellow-128, C. I. Pigment Yellow-129, C. I. Pigment Yellow-151 and C. I. Pigment Yellow-154, but not limited these.

The amount of the pigment to be used for the ink composition of the present invention is preferably 0.1 to 50 wt % relative to the weight of the ink. When the amount of the pigment is less than 0.1 wt %, sufficient image density may not be obtained and when the amount exceeds 50 wt %, the viscosity tends to be too high. A more preferable range is 0.5 wt % to 30 wt %.

The solvent contained in the ink composition of the present invention is not particularly limited, but it means a solvent in which the components contained in the ink composition can be dissolved, suspended or dispersed. The solvent in the present invention includes organic solvents such as various linear, branched or cyclic aliphatic hydrocarbons, aromatic hydrocarbons and heteroaromatic hydrocarbons, aqueous solvents and water.

Particularly, in the ink composition of the present invention, water and aqueous solvents are preferably used.

Examples of aqueous solvents include polyhydric alcohols such as ethylene glycol, diethylene glycol, triethylene glycol, polyethylene glycol, propylene glycol, polypropylene glycol and glycerol; polyhydric alcohol ethers such as ethylene glycol monomethyl ether, ethylene glycol monoethyl ether, ethylene glycol monobutyl ether, diethylene glycol monoethyl ether and diethylene glycol monobutyl ether; and nitrogen solvents such as N-methyl-2-pyrrolidone, substituted pyrrolidone and triethanolamine. When the composition is used as an ink, monohydric alcohols such as methanol, ethanol and isopropyl alcohol may be used to speed up drying on paper.

The content of the above-mentioned water or aqueous solvent in the ink composition of the present invention is preferably in the range of 20 to 99 wt %, more preferably in the range of 30 to 95 wt % relative to the total weight of the aqueous dispersion.

The content of the block polymer contained in the ink composition of the present invention is preferably 0.1 to 50 wt %, more preferably 0.5 to 20 wt %. When the content of the block polymer is less than 0.1 wt %, the dye or pigment contained in the ink composition of the present invention may not be sufficiently dispersed. When the content exceeds 50 wt %, the viscosity tends to be too high.

In the present-invention, the coloring material such as dye and pigment, which is the functional substance, is in the form of particles, preferably included in a polymer micelle. This is preferable in that the average particle size of the particles easily becomes small and the particle size distribution narrows easily and that the environmental stability can be improved by including the coloring material by a polymer. The method of confirming the inclusion of the functional substance in the polymer micelle is described. For example, when a functional substance that cannot be dispersed or dissolved in a solvent by itself is used, the inclusion of the functional substance in the polymer micelle can be confirmed by separation of the functional substance in the solvent after the polymer micelle is disintegrated somehow. Alternatively, the inclusion can be confirmed by direct observation using an electron microscope.

One of the preferable embodiments of the present invention is a dispersion composition containing a functional substance, of which pH is not less than 5, in which the functional substance and a nonionic block polymer are dispersed in a solvent in the form of particles in the presence of a cation. More preferable is a composition comprising a nonionic block polymer, a functional substance such as a dye which exhibits a specific function, a cation and water or a solvent. More preferably, the pH is not less than 7. The above-mentioned cation is preferably coordinated with the block polymer and of the cations, metal cation is preferable. Of the metal cations, $Li^+$, $Na^+$ and $K^+$ are preferable. The coordination of the cation with the block polymer facilitates electrical repulsion and therefore is effective for suppressing aggregation of particles. The coordination of the cation can be confirmed by a known method such as infrared, visible or ultraviolet ray absorption spectrum methods. The cation concentration in the present invention is preferably $1.0 \times 10^{-6}$ to 10 mol/L.

The above-mentioned ink composition may be responsive to stimulation. According to this stimulation-responsiveness, by applying stimulation during image forming step to thicken the ink, superior fixing property can be imparted. The stimulation to be applied includes temperature change, exposure to electromagnetic waves, pH change and concentration change, which can be suitably selected in view of the image to be formed.

The state (property) of the dispersion composition containing a functional substance of the present invention can be changed in response to various types of stimulation. In the present invention, types of stimulation include temperature change, application of electric field, exposure to light rays or electromagnetic wave such as ultraviolet ray, visible ray and infrared ray, pH change of the composition, addition of chemical substances and concentration change of the composition.

Preferable examples of stimulation in the present invention are as follows. The first one is temperature change; the range of the temperature change is approximately the phase transition temperature of the composition. The second one is exposure to electromagnetic wave; the range of the wavelength is preferably 100 to 800 nm. The third one is pH change of the composition; the range of pH change is preferably pH 3 to pH 12. The fourth one is the concentration change of the composition; the concentration change by, for example, evaporation or absorption of the solvent in the composition, or by concentration change of polymers dissolved in the composition can be mentioned. The change of the concentration is preferably within the range that the phase transition temperature of the composition occurs. In the present invention, two or more types of stimulation may be applied in combination.

Examples of changes in state in response to stimulation are phase change from sol to gel, phase change from solution to solid and changes in chemical structure. The "stimulation responsiveness" in the present invention means that properties of the composition go through changes in response to the stimulation as mentioned above. Specifically, the stimulation responsiveness means that the form or physical properties of the composition considerably change in response to the stimulation or environmental change, such as temperature change, application of electric field, exposure to electromagnetic waves, pH change, addition of a chemical substance or concentration change of the composition.

In the composition of the present invention, the properties or state thereof to be changed can be selected depending on the intended use of the composition. For example, improvement of fixing property to recording medium due to phase change of the composition (e.g. from sol to gel) in response to stimulation can be mentioned.

The ink composition of the present invention may contain, where necessary, various additives and auxiliary agents. Further, a resin having hydrophilic part and hydrophobic part can also be used. Examples of the resin having a hydrophilic part and a hydrophobic part include a copolymer of a hydrophilic monomer and a hydrophobic monomer. Examples of the hydrophilic monomer include acrylic acid, methacrylic acid, maleic acid, fumaric acid, monoesters of the aforementioned carboxylic, acids, vinyl sulfonic acid, styrene sulfonic acid, vinyl alcohol, acrylamide and methacryloxyethyl phosphate. Examples of the hydrophobic monomer include styrene derivatives such as styrene and α-methyl styrene, vinyl cyclohexane, vinyl naphthalene derivatives, acrylic acid esters and methacrylic acid esters. The hydrophilic monomer and the hydrophobic monomer are not limited to those mentioned above.

Examples of the additives that can be contained in the composition of the present invention include crosslinking agents, acid forming agents and polymerization initiators, which can be activated by applying heat or electromagnetic waves.

Other additives that can be added to the composition of the present invention include pH adjusters used for stabilizing ink and achieving ink stability in the ink-feeding pipe in the recording apparatus, penetrants that facilitate penetration of the ink into the recording medium to speed up apparent drying, antifungal agents that prevent fungus from growing, chelating agents that sequester metal ions in ink to prevent metal from precipitating at nozzles or prevent insoluble substances from precipitating from the ink, defoaming agents that prevent generation of foam during circulation, transfer or production of printing fluid, antioxidant, viscosity controlling agents, conductive agents and ultraviolet ray absorbers.

In the following, details of the ink composition for ink jet recording, which is one of the preferable embodiments of the present invention, are described. The ink-jet ink composition of the present invention can be prepared as follows: a block polymer, a coloring material and/or a cation are added to an aqueous solvent and water and dispersed using a disperser, and then after coarse particles are removed by centrifugation, water or solvent and additives are added thereto, followed by stirring, mixing and filtrating.

Examples of the disperser are an ultrasonic homogenizer, a laboratory homogenizer, a colloid mill, a jet mill and a ball mill and these can be used alone or in a combination.

Next, the method of forming an image of the present invention is described.

[Method of Forming Image]

The ink composition of the present invention can be used in various image forming apparatuses of various methods such as ink jet recording and electrophotography to form image. It is particularly preferable to use the ink composition of the present invention in the ink jet method. The ink jet method to be used may be known methods such as a piezo ink jet system using a piezoelectric element, thermal ink jet system which conduct recording utilizing a bubble formed by applying thermal energy. In addition, a continuous type method and an on-demand type method may also be used. The ink composition of the present invention can be used in a recording system in which ink is applied to an intermediate transfer member and then transferred to the final recording medium such as paper.

When the stimulation-responsive ink composition of the present invention is used as the ink jet ink, the composition can be used, for example, in the following modes. Ink aggregation can be induced by the following stimulation (a) to (d).

(a) Ink Responsive to Temperature Stimulation

The temperature difference between the ink tank and the recording medium to which the ink is applied by ejection causes phase change in the ink-jet ink composition of the present invention, resulting in rapid thickening or aggregation of insoluble components.

(b) Ink Responsive to Electromagnetic Wave Stimulation

Electromagnetic wave stimulation can be given by exposing the ink to visible rays after ejected from an ink tank being a dark room, or to electromagnetic wave emitted from the electromagnetic wave emission member provided in the ink jet recording apparatus. The electromagnetic wave stimulation causes polymerization. of polymerizable functional groups contained in the ink-jet ink composition of the present invention, resulting in thickening or aggregation of insoluble components.

(c) Ink Responsive to pH Change Stimulation

When ink is applied to a recording medium, the pH of the ink changes under the effect of the recording medium and this pH change causes phase change in the ink-jet ink composition of the present invention, resulting in thickening or aggregation of insoluble components.

(d) Ink-jet Ink Composition Responsive to Concentration Change Stimulation

The concentration change of the ink occurs when water and aqueous solvent contained in the ejected ink evaporate or are absorbed by the recording medium, causing phase change in the ink-jet ink composition of the present invention, resulting in rapid thickening or aggregation of insoluble components.

According to these changes in the ink properties, blurring and feathering can be improved and excellent fixing properties can be exhibited. The change in ink properties is not limited to the above-described thickening or aggregation of insoluble components.

As the method for giving stimulation, various methods can be applied. One preferred method is to mix or contact a stimulating substance, which serves as stimulation, with the above-described stimulation-responsive ink. For example, a composition having a corresponding pH can be mixed with the pH-responsive ink described in (c) by using an ink jet method. As described in Japanese Patent Application Laid-Open No. S64-63185, a stimulating substance, which serves as stimulation, is applied to the entire image-forming area by using an ink jet head. Also, as described in Japanese Patent Application Laid-Open No. H8-216392, superior images can be formed by controlling the amount of the stimulating substance.

The stimulating substance, which serves as stimulation, can also serve as ink containing a dye or a pigment. For example, if any one of cyan-, magenta-, yellow- and black- (CMYK) ink used for color ink jet system is used as stimulating ink, and any other one of CMYK inks is used as stimulation-responsive ink, color blurring can be improved. As to which one of CMYK ink should be used as the stimulation-responsive ink and which other one of CMYK ink should be used as the stimulating ink, various combinations are possible. In the present invention, any combination can be used and the selection of a combination is not limited. In addition, with respect to the kind of the composition which gives stimulation and the stimulation-responsive ink, they can be used for all of the above stimulation-responsive patterns and there is no particular limitation.

Next, the image recording apparatus of the present invention is described.

Image Recording Apparatus

The ink jet recording apparatus using the ink composition for ink jet of the present invention includes ink jet recording apparatuses such as piezo ink jet system using a piezoelectric element and thermal ink jet system which conduct recording after bubbling by applying thermal energy.

FIG. 1 is a schematic diagram illustrating the function of the ink jet recording apparatus. Reference numeral 50 denotes a central processing unit (CPU) of the ink jet recording apparatus. The program for controlling CPU 50 may be stored in program memory 66 or in storage means such as EEPROM (not represented in the Figure) as a firmware. Program memory 66 of the ink jet recording apparatus receives recording data from recording data creating means (not represented in the Figure, computers etc.). The recording data may be information such as an image or text to be printed as it is, or a compressed or coded form thereof. When processing the compressed or coded information, information of image or text to be printed can be obtained by conducting decompression or extraction by CPU 50. The relative position of the head against the recording medium can be communicated to CPU 50 by providing X encoder 62 (e.g., for X direction or main scanning direction) and Y encoder 64 (e.g., for Y direction or sub scanning direction).

CPU 50 sends a signal for recording an image to X motor drive circuit 52, Y motor drive circuit 54 and head drive circuit 60 based on the information in program memory 66, X encoder 62 and Y encoder 64. X motor drive circuit 52 activates X direction drive motor 56 and Y motor drive circuit 54 activates Y direction drive motor 58 to move head 70 relative to the recording medium to a recording position. Head drive circuit 60 sends a signal for ejecting each ink composition (Y,M,C,K) or a stimulating substance which serves as stimulation at the time head 70 has moved to the recording position to conduct recording. Head 70 may eject a single color ink composition or several kinds of ink compositions, or may also have a mechanism of ejecting a stimulating substance which serves as stimulation.

The ink composition of the present invention can be used for an apparatus using a direct recording system in which ink is directly applied to a recording medium, or for an indirect recording apparatus employing a recording system in which an image is formed by ink on an intermediate transfer member which has formed a latent image and then the image is transferred to a final recording medium such as paper. In addition, the composition can be used for an apparatus using an intermediate transfer member with a direct recording system.

Next, the recording medium of the present invention is described.

[Recording Medium]

While the stimulating substance can be mixed or contacted with stimulation-responsive ink as described above, the recording medium itself may have a system for giving stimulation. For example, there are a method of conducting recording on acid paper by using acid responsive ink as pH responsive ink; a method of conducting recording on a recording medium which releases a pH changing substance in response to application of heat, electromagnetic wave or pressure, using pH responsive ink as stimulation responsive ink; and a method of conducting recording on a recording medium which releases a crosslinking agent or polymerization initiator in response to application of heat, electromagnetic waves or pressure, using a stimulation responsive ink containing a crosslinkable or polymerizable functional group. In the present invention, the recording medium may be in any known form such as plain paper, thermal paper and acid paper.

When the direct recording system is employed, the above-mentioned recording medium is used as the final recording medium. On the other hand, when the indirect recording system is employed, the above-mentioned recording medium can be used as the intermediate transfer member or as the final recording medium.

EXAMPLES

Hereinafter, the present invention is explained in detail by means of Examples, but the present invention is not limited to these Examples.

Example 1

<Synthesis of Block Polymer>

(1) Synthesis of AB Diblock Polymer Comprising 2-methoxyethyl vinyl ether (MOVE: block B) and 2-ethoxyethyl vinyl ether (EOVE: block A)

Poly[(2-methoxyethyl vinyl ether)-b-(2-ethoxyethyl vinyl ether)](b represents that the polymer is a block polymer) was synthesized by the following procedure.

The atmosphere in a glass container equipped with a three-way stopcock was replaced with nitrogen, and the glass container was heated to 250° C. under a nitrogen atmosphere to remove adsorbed water. After cooling the system to room temperature, 12 mmol (millimoles) of EOVE, 16 mmol of ethyl acetate, 0.1 mmol of 1-isobutoxyethyl acetate and 11 ml of toluene were added, and the system was further cooled. When the temperature of the system reached 0° C., 0.2 mmol of ethyl aluminum sesquichloride (an equimolar mixture of diethyl aluminum chloride and ethyl aluminum dichloride) was added to initiate polymerization and the component A of the AB block polymer was synthesized. The molecular weight was monitored with time using gel permeation chromatography (GPC) to confirm the completion of polymerization of the component A (EOVE).

18 mmol of MOVE (component B) was added and polymerization was conducted. The completion of polymerization of the component B was confirmed by monitoring using GPC. The polymerization reaction was stopped by the addition of 0.3 wt % ammonia/methanol aqueous solution to the system. The reaction mixture was diluted with dichloromethane, washed with 0.6 N hydrochloric acid three times and with distilled water three times. The resulting organic layer was evaporated on an evaporator to dryness and the substance obtained was further vacuum dried to obtain the objective MOVE-EOVE diblock polymer. The resultant compound was identified by NMR and GPC. Mn was 57700 and Mn/Mw was 1.23.

The flowability of the obtained block polymer was confirmed even at -20° C., which means that the block polymer has a glass transition temperature of not more than −20° C. This polymer was dispersed in water at 25° C. up to 10 wt %. At a temperature lower than 20° C., the block polymer was completely soluble in water. This is because the EOVE segment becomes hydrophobic from hydrophilic at 20° C. or higher.

<Preparation of Dispersion Composition>

0.3 ml of a solution in which 10 wt % of an oil-soluble dye (Oil Blue N, available from Sigma-Aldrich Co.) was dissolved in a mixed solvent of toluene/chloroform (1:1) was dispersed in a 3 ml of 5 wt % aqueous dispersion of the above-mentioned block polymer by using an ultrasonic homogenizer for 10 minutes. The dispersion was filtrated by a 1 μm filter to prepare a dye dispersion composition.

Thereto was added 0.1 ml of a 0.1 N aqueous sodium hydroxide solution and the resulting mixture was homogenized by an ultrasonic homogenizer for 10 minutes and left standing for an hour. The pH was 12 according to pH test paper. This dispersion was highly transparent and the color was blue.

The average particle size d and the index of dispersion degree $\mu/G^2$ of the particles dispersed in the thus obtained dye dispersion composition were measured by using a dynamic light scattering device (DLS-7000 made by Otsuka Electronics Co., Ltd). for measurement, the sample was 100-fold diluted with an aqueous sodium hydroxide solution of the same concentration to prevent pH fluctuation. The average particle size d was 186 nm and the index of dispersion degree $\mu/G^2$ was 0.08.

When the dye dispersion composition was cooled to 10° C. to disintegrate the polymer micelles and the polymer was dissolved in water, the dye separated from the dye solution and the aqueous phase turned colorless.

This confirmed the inclusion of the coloring material.

Comparative Example 1

Using a random copolymer of styrene and acrylic acid (number average molecular weight 13000, polymerization ratio 85:15), dispersion ink was prepared in the same manner as in Example 1. The ink was blue but a remarkable white cloud was observed. The average particle size d was 378 nm and the index of dispersion degree $\mu/G^2$ was 0.9.

Comparative Example 2

The dispersion of the above Comparative Example 1 was centrifuged and supernatant was collected. When the supernatant was divided to three fraction from the top to bottom, the average particle size and the index of dispersion degree $\mu/G^2$ of the three supernatant fractions from the top to the bottom (liquid A, liquid B, liquid C) were [240 nm, 0.44] for liquid A, [290 nm, 0.53] for liquid B and [450 nm, 0.66] for liquid C, and remarkable white clouds were observed in all fractions.

Regarding liquid A and the ink composition of Example 1, white cloud was hardly observed in the latter composition, whereas an apparently more remarkable white cloud was observed in liquid A.

Example 2

Using the oil soluble dye used in Example 1, a dispersion ink composition was prepared in the same manner except that chloroform was used as the solvent. The average particle size d and the index of dispersion degree $\mu/G^2$ of the dispersion particles were measured to be 150 nm and 0.08, respectively. The transparency was as excellent as in Example 1.

Example 3

Using the oil soluble dye used in Example 1, a dispersion ink composition was prepared in the same manner except that dichloromethane was used as the solvent. After leaving at 50° C. for three hours, the odor of the solvent was confirmed to vanish. The average particle size d and the index of dispersion degree $\mu/G^2$ of the dispersion particles were measured to be 124 nm and 0.08, respectively. The transparency was as excellent as in Example 1. When this ink composition was cooled to 10° C., precipitation of solid dye was confirmed.

Example 4

The ink composition of Example 3 and liquid A, liquid B and liquid C of Comparative Example 2 were diluted 50 times and the light transmittance at 500 nm was measured using a turbidimeter (made by Youngwoo Instruments). The higher the transmittance, the brighter the color. The transmittance of the ink composition of Example 3 and liquid A, liquid B and liquid C of Comparative Example 2 were 41%, 26%, 23% and 21%, respectively.

Example 5

Using the ink composition prepared in Example 3, the fixing strength was evaluated. The printing head of an ink jet printer (BJF800 made by Cannon Inc.) was filled with the ink composition and printing was conducted on plain paper using the ink jet printer.

The ink-jet ink responsive to pH change stimulation was evaluated. Before printing, a 5 wt % aqueous solution of polyacrylic acid (pH 2) was sprayed on plain paper to prepare a recording medium capable of giving stimulation. Ink jet recording was conducted on this medium as described above and after 30 seconds, the printed area was pressed hard with a finger, but no ink adhered to the finger.

When the ink composition and the polyacrylic acid solution of pH2 were mixed, blue gel was formed immediately.

Comparative Example 3

The following ink was prepared. 5 parts by weight of a self-dispersing pigment (product name CAB-0-JET300, available from Cabot Corporation), 0.5 parts by weight of a surfactant (Nonion E-230 available from NOF Corporation), 5 parts by weight of ethylene glycol and 89.5 parts by weight of ion exchange water were mixed to prepare an ink composition. Using this ink composition, recording was conducted by the ink jet printer used in Example 5 (BJF800 made by Cannon Inc.) on the recording medium used in Example 5. After 30 seconds, the printed area was pressed hard with a finger and the ink adhered to the finger.

Example 6

<Synthesis of Block Polymer>

Synthesis of AB Diblock Polymer Comprising Isobutyl Vinyl Ether (IBVE: Block A) and 2-methoxyethyl vinyl Ether (MOVE: Block B)

Poly[(IBVE)-b-(MOVE)](b represents that the polymer is a block polymer) was synthesized by the following procedure.

The atmosphere in a glass container equipped with a three-way stopcock was replaced with nitrogen, and the glass container was heated to 250° C. under nitrogen atmosphere to remove adsorbed water. After cooling the system to room temperature, 4 mmol (millimoles) of IBVE, 5 mmol of ethyl acetate, 0.02 mmol of 1-isobutoxyethyl acetate and 4.5 ml of toluene were added, and the system was further cooled. When the temperature of the system reached 0° C., 0.1 mmol of ethyl aluminum sesquichloride (an equimolar mixture of diethyl aluminum chloride and ethyl aluminum dichloride) was added to initiate polymerization and the component A of the AB block polymer was synthesized. The molecular weight was monitored with time using molecular sieve column chromatography (GPC) to confirm the completion of polymerization of the component A (IBVE).

Then 4 mmol of MOVE (component B) was added and polymerization was conducted. The completion of polymerization of the component B was confirmed by monitoring using GPC. The polymerization reaction was stopped by the addition of 0.3 wt % ammonia/methanol aqueous solution to the system. The reaction mixture was diluted with dichloromethane, washed with 0.6 mol/L hydrochloric acid three times and with distilled water three times. The organic layer was evaporated on an evaporator to dryness and vacuum dried to obtain the objective IBVE-MOVE diblock polymer. The resultant compound was identified by NMR and GPC. Mn was 37700 and Mw/Mn was 1.16.

The flowability of the obtained block polymer was confirmed at −20° C., which means that the block polymer has a glass transition temperature of −20° C. or lower. This polymer dispersed in water at 20° C. up to 10 wt %.

<Preparation of Dispersion Composition>

26 parts by weight of the above block polymer and 10 parts by weight of oil-soluble dye Oil Blue N, (the same product name, available from Sigma-Aldrich Co.) were dissolved in dimethylformamide and converted to aqueous phase using 400 parts by weight of distilled water to obtain an ink composition. Oil Blue was not separated or precipitate even after leaving for 10 days.

Thereto was added 0.1 ml of a 0.1 N aqueous sodium hydroxide solution and the resulting mixture was homogenized by an ultrasonic homogenizer for 10 minutes and left for an hour. The pH was 12 according to pH test paper. This dispersion was highly transparent and the color was blue.

The average particle size d and the index of dispersion degree $\mu/G^2$ of the particles dispersed in the thus obtained dye dispersion composition were measured by using a dynamic light scattering device (DLS-7000 made by Otsuka Electronics Co., Ltd). To avoid pH fluctuation, measurement was conducted by diluting 100 times with an aqueous sodium hydroxide solution of the same concentration. The average particle size d was 98 nm and the index of dispersion degree $\mu/G^2$ was 0.08.

Example 7

Synthesis of Diblock Polymer Comprising Isobutyl Vinyl Ether (IBVE: Block A) and 2-methoxyethyl Vinyl Ether (MOVE: Block B) having —O(CH$_2$)$_5$COOH at the End of Block B.

Poly [(IBVE)-b-(MOVE)—O((CH$_2$)$_5$COOH)](b represents that the polymer is a block polymer) was synthesized by the following procedure.

The atmosphere in a glass container equipped with a three-way stopcock was replaced with nitrogen, and the glass container was heated to 250° C. under nitrogen atmosphere to remove adsorbed water. After cooling the system to room temperature, 12 mmol (millimoles) of IBVE, 16 mmol of ethyl acetate, 0.1 mmol of 1-isobutoxyethyl acetate and 11 ml of toluene were added, and the system was cooled. When the temperature of the system reached 0° C., 0.2 mmol of ethyl aluminum sesquichloride (an equimolar mixture of diethyl aluminum chloride and ethyl aluminum dichloride) was added to initiate polymerization. The molecular weight was monitored with time using molecular sieve column chromatography (GPC) to confirm the completion of polymerization of the component A (IBVE).

Then 12 mmol of component B (MOVE) was added and polymerization was conducted. After confirming the completion of polymerization of the component B by monitoring using GPC, the polymerization reaction was stopped by the addition of 30 mmol of HO(CH$_2$)$_5$COOEt. The reaction mixture was diluted with dichloromethane, washed with 0.6 M hydrochloric acid three times and with distilled water three times. The obtained organic layer was concentrated to dryness on an evaporator to obtain a block polymer of poly [(IBVE)-b-(MOVE)—O((CH$_2$)$_5$COOEt)].

The synthesized compound was identified by GPC and NMR. In particular, the terminal portion was identified by the confirmation of the existence of terminal portion in the NMR spectrum of the polymer obtained by the DOSY method. Mn was 21000 and Mw/Mn was 1.4. Mn means number average molecular weight and Mw means weight average molecular weight.

The ester moiety at the end of the obtained poly[(IBVE)-b-(MOVE)—O((CH$_2$)$_5$COOEt)] was hydrolyzed in a mixed solution of dimethylformamide and aqueous sodium hydroxide solution, followed by the identification by NMR. Poly [(IBVE)-b-(MOVE)—O(CH$_2$)$_5$COOH], which is the objective block polymer, was obtained.

Further, by neutralizing in an aqueous dispersion using 0.1 N hydrochloric acid, a tri-block polymer in which the component C was a free carboxylic acid was obtained.

The flowability of the block polymer was confirmed at −20° C., which means that the block polymer has a glass transition temperature of −20° C. or lower. This polymer dispersed in water at 20° C. up to 10 wt %.

<Preparation of Dispersion Composition>

26 parts by weight of the block polymer in the carboxylic acid salt form obtained as described above and 10 parts by weight of oil-soluble dye Oil Blue N, (the same product name, available from Sigma-Aldrich Co.) were dissolved in dimethylformamide and converted to aqueous phase using 400 parts by weight of distilled water to obtain an ink composition. Oil Blue did not separate or precipitate even after leaving for 10 days.

The average particle size d and the index of dispersion degree $\mu/G^2$ of the particles dispersed in the thus obtained dye dispersion composition were measured by using a dynamic light scattering device (DLS-7000 made by Otsuka Electronics Co., Ltd). To avoid pH fluctuation, measurement was conducted with 100-fold dilution using an aqueous sodium hydroxide solution of the same concentration. The average particle size d was 77 nm and the index of dispersion degree $\mu/G^2$ was 0.07.

Comparative Example 4

Using a random copolymer of styrene and acrylic acid (number average molecular weight 13000, polymerization ratio 85:15), dispersion ink was prepared in the same manner as in Examples 6 and 7. The ink was blue but a remarkable white cloud was observed. The average particle size d was 378 nm and the index of dispersion degree $\mu/G$ was 0.9.

Comparative Example 5

The dispersion of the above Comparative Example 4 was centrifuged and the supernatant was collected. The average particle size and the index of dispersion degree $\mu/G^2$ of the three supernatant fractions from the top to bottom (liquid A, liquid B, liquid C) were [240 nm, 0.44] for liquid A, [290 nm, 0.53] for liquid B and [450 nm, 0.66] for liquid C, and remarkable clouding was observed in all fractions.

While almost no clouding was observed in the ink compositions of Examples 6 and 7, white cloud was conspicuous in liquid A.

Examples 8 and 9

Dispersion ink compositions of Examples 8 and 9 were prepared in the same manner as in Examples 6 and 7 using the oil soluble dye used in Examples 6 and 7 except that chloroform was used as a solvent.

The average particle size and the index of dispersion degree $\mu/G^2$ of the dispersion ink were [95 nm, 0.08] in Example 8, and [72 nm, 0.07] in Example 9. The transparency was as excellent as in Examples 6 and 7.

Examples 10 and 11

Dispersion ink compositions of Examples 10 and 11 were prepared in the same manner as in Examples 6 and 7 using the oil soluble dye used in Examples 1 and 2, except that dichloromethane was used as a solvent, The average particle size and the index of. dispersion degree $\mu/G^2$ of the dispersion ink were [89 nm, 0.07] in Example 10, and [68 nm, 0.06] in Example 11. The transparency was as excellent as in Examples 6 and 7.

Example 12

The ink compositions of Examples 8 and 9 and liquid A, liquid B and liquid C of Comparative Example 5 were each diluted 50 times and the light transmittance at 500 nm was measured using a turbidimeter (made by Youngwoo Instruments). The higher the transmittance, the brighter the color. The transmittance of the ink compositions of Examples 8 and 9 and liquid A, liquid B and liquid C of Comparative Example 5 were 47% (Example 8), 42% (Example 9), 26% (Liquid A), 23% (Liquid B) and 21% (Liquid C), respectively.

Example 13

Poly[(EOVE)-b-(MOVE)—O($CH_2$)$_5$COOH], which contains 2-ethoxyethyl vinyl ether (EOVE) that shows hydrophilicity at a temperature lower than 20° C., and hydrophobicity at 20° C. or above, was obtained in the same manner as in Example 7 except that 12 mmol of EOVE was used instead of 12 mmol of IBVE, i.e., the component A of poly[(IBVE)-b-(MOVE)—O(($CH_2$)$_5$COOH)] obtained in Example 7. The synthesized compound was identified by GPC and NMR. Mn was 24200 and Mw/Mn was 1.4. Mn means number average molecular weight and Mw means weight average molecular weight.

26 parts by weight of the obtained block polymer in carboxylic salt form and 10 parts by weight of oil-soluble dye Oil Blue N (the same product name, available from Sigma-Aldrich Co.) were dissolved in dimethylformamide and converted to aqueous phase using 400 parts by weight of distilled water to obtain an ink composition. Oil Blue did not separate or precipitate even after standing for 10 days.

The average particle size d and the index of dispersion degree $\mu/G^2$ of the particles dispersed in the thus obtained dye dispersion composition were measured by using a dynamic light scattering device (DLS-7000 made by Otsuka Electronics Co., Ltd). To avoid pH fluctuation, measurement was conducted by diluting the sample 100 times with an aqueous sodium hydroxide solution of the same concentration. The average particle size d was 79 nm and the index of dispersion degree $\mu/G^2$ was 0.07.

When the dye dispersion composition was cooled to 10° C., the polymer micelles disintegrated and the polymer dissolved in water, the dye separated from the dye solution and the aqueous phase turned colorless. This confirmed the inclusion of the coloring material.

Example 14

Using the ink compositions prepared in Examples 6 and 7, the fixing strength was evaluated. The printing head of an ink jet printer (BJF800 made by Cannon Inc.) was filled with the ink composition and printing was conducted on plain paper using the ink jet printer.

The ink-jet ink responsive to pH change stimulation was evaluated.

In the printing using this ink-jet ink, a 5 wt % aqueous polyacrylic acid solution of pH 2 was first sprayed onto plain paper as a recording medium to prepare a recording medium capable of giving stimulation. Ink jet recording was conducted on this medium as described above. After 30 seconds, the printed area was pressed hard with a finger, but no ink adhered to the finger.

When the ink composition and the 5 wt % aqueous polyacrylic acid solution of pH 2 were mixed, formation of blue gel was occurred immediately.

Comparative Example 6

Using the ink originally provided in the ink jet printer (BJF800 made by Cannon Inc.) used in Example 14, blue color printing was conducted on the recording medium of Example 14. After 30 seconds, the printed area was pressed hard with a finger and the ink adhered to the finger.

Example 15

Synthesis of diblock polymer of isobutyl vinyl ether and $CH_2=CHOCH_2CH_2OPhPh$ (IBVE-r-VEEtPhPh: block A) and 4-(2-vinyloxy)ethoxy benzoic acid (block B)

The atmosphere in a glass container equipped with a three-way stopcock was replaced with nitrogen, and the glass container was heated to 250° C. under nitrogen atmosphere to remove adsorbed water. After cooling the system to room temperature, 6 mmol (millimoles) of IBVE, 6 mmol of VEEtPhPh, 16 mmol of ethyl acetate, 0.1 mmol of 1-isobutoxyethyl acetate and 11 ml of toluene were added, and the system was cooled. When the temperature of the system reached 0° C., 0.2 mmol of ethyl aluminum sesquichloride (an equimolar mixture of diethyl aluminum chloride and ethyl aluminum dichloride) was added to initiate polymerization. The molecular weight was monitored with time using molecular sieve column chromatography (GPC) to confirm the completion of polymerization of the component A.

10 mmol of a toluene solution containing the block B component was added to continue polymerization. The polymerization reaction was stopped after 20 hours by addition of 0.3 wt % ammonia/methanol aqueous solution to the system. The reaction mixture was diluted with dichloromethane, washed with 0.6 mol/L hydrochloric acid three times and with distilled water three times. The obtained organic phase was concentrated to dryness on an evaporator, and further vacuum dried and repeatedly dialyzed against a methanol solvent using a cellulose semi-permeable membrane to remove monomer compounds. Thus the objective diblock polymer was obtained. The resultant compound was identified by NMR and GPC. Mn was 16700 and Mw/Mn was 1.12. The polymerization ratio A:B was 100:30. The polymerization ratio of the two monomers in the block A was 1:1.

The block polymer obtained was hydrolyzed in a mixed solution of dimethylformamide and aqueous sodium hydroxide solution to obtain a tri-block polymer of which block B component was hydrolyzed and in a sodium salt form. The compound was identified by NMR and GPC.

Further, by neutralizing in an aqueous dispersion using 0.1 N hydrochloric acid, a tri-block copolymer in which the component B was in a free carboxylic acid form was obtained. The compound was identified by NMR and GPC.

<Preparation of Dispersion Composition>

26 parts by weight of the above block polymer and 10 parts by weight of one of the oil-soluble dyes specified below were dissolved in dimethylformamide and converted to aqueous phase using 400 parts by weight of distilled water to obtain an ink composition. No oil-soluble dyes separated or precipitated even after leaving for 10 days.

Thereto was added 0.1 ml of a 0.1 N aqueous sodium hydroxide solution and the resulting mixture was homogenized by an ultrasonic homogenizer for 10 minutes and left for an hour. The pH was 12 according to pH test paper. The dispersions were highly transparent and the color was blue or yellow.

The average particle size d and the index of dispersion degree $\mu/G^2$ of the particles dispersed in the thus obtained dye dispersion compositions were measured by using a dynamic light scattering device (DLS-7000 made by Otsuka Electronics Co., Ltd). To avoid pH fluctuation, measurement was conducted by diluting the samples 100 times with an aqueous sodium hydroxide solution of the same concentration. When Oil Blue N (the same product name, available from Sigma-Aldrich Co.), VALIFAST Red 3304 (available from Orient Chemical Industries, Ltd.) and VALIFAST Yellow 3108 (available from Orient Chemical Industries, Ltd.) were used as the oil-soluble dye, the average particle and the index of dispersion degree $\mu/G^2$ measured by. using a dynamic light scattering device (DLS-7000 made by Otsuka Electronics Co., Ltd) were 63.5 nm and 0.09 for Oil Blue N, 49.7 nm and 0.08 for VALIFAST Yellow 3108, 39.1 nm and 0.19 for VALIFAST Yellow 3108.

Comparative Example 7

Using a random copolymer of styrene and acrylic acid (number average molecular weight 13000, copolymerization ratio 85:15) and Oil Blue N as an oil-soluble dye, dispersion ink was prepared in the same manner as in Example 15. The ink was blue but a remarkable white clouding was observed. The average particle size d was 378 nm and the index of dispersion degree $\mu/G^2$ was 0.9.

Comparative Example 8

Each dispersion of the above Comparative Example 7 was centrifuged and the supernatant was collected. The average particle size and the index of dispersion degree $\mu/G^2$ of the three supernatant fractions from the top to the bottom (liquid A, liquid B, liquid C) were 240 nm and 0.44 for liquid A, 290 nm and 0.53 for liquid B, and 450 nm and 0.66 for liquid C, and white cloud was observed conspicuously in all fractions.

While almost no white cloud was observed in the ink compositions of Example 15, an apparently more conspicuous clouding was observed in liquid A.

Example 16

Using the oil soluble dye used in Example 15, a dispersion ink composition was prepared-in the same manner except that chloroform was used as the solvent. The average particle size and the index of dispersion degree $\mu/G^2$ of the dispersion ink were 95 nm and 0.08. Transparency was as excellent as in Example 15.

Example 17

Using the oil soluble dye, a dispersion ink composition was prepared in the same manner as in Example 15, except that dichloromethan was used as the solvent. The average particle size and the index of dispersion degree $\mu/G^2$ of the dispersion ink were 89 nm and 0.07 respectively. The transparency was as excellent as in Examples 15 and 16.

Example 18

The ink composition of Example 15 and liquid A, liquid B and liquid C of Comparative Example 8 were each diluted 50 times and the light transmittance at 500 nm was measured using a turbidimeter (made by Youngwoo Instruments). The higher the transmittance, the brighter the color. The transmittance of the dispersion ink composition of Example 15 that uses an oil-soluble dye of Oil Blue N, and transmittance of liquid A, liquid B and liquid C of Comparative Example 8 were 51%, 26%, 23% and 21%, respectively.

Example 19

A block polymer which contains 2-ethoxyethyl vinyl ether (EOVE) having hydrophilic property at a temperature lower than 20° C. and hydrophobic property at 20° C. or higher was obtained by using 12 mmol of EOVE instead of 6 mmol of IBVE and 6 mmol of VEEtPhPh, which constitute the component A (IBVE-r-VEEtPhPH) of the block polymer obtained in Example 15. The other conditions for synthesis were the same as in Example 15. The synthesized compound was identified by GPC and NMR. Mn was 22900 and Mw/Mn was 1.16. Mn means number average molecular weight and Mw means weight average molecular weight.

26 parts by weight of the obtained block polymer in carboxylic salt form and 10 parts by weight of oil-soluble dye Oil Blue N (the same product name, available from Sigma-Aldrich Co.) were dissolved in dimethylformamide and converted to aqueous phase using 400 parts by weight of distilled water to obtain an ink composition. Oil Blue did not separate or precipitate even after standing for 10 days.

The average particle size d and the index of dispersion degree $\mu/G^2$ of the particles dispersed in the thus obtained dye dispersion composition were measured by using a dynamic light scattering device (DLS-7000 made by Otsuka Electronics Co., Ltd). To avoid pH fluctuation, measurement was conducted by diluting the sample 100 times with an aqueous sodium hydroxide solution of the same concentration. The average particle size d was 67 nm and the index of dispersion degree $\mu/G^2$ was 0.07.

When the dye dispersion composition was cooled to 10° C., the polymer micelles disintegrated and the polymer dissolved in water, the dye separated from the dye solution and the aqueous phase turned colorless. This confirmed the inclusion of the coloring material.

Example 20

Fixing strength of the ink composition of Example 15 containing Oil Blue N as an oil-soluble dye was evaluated. The ink was filled in the printing head of an ink jet printer (BJF800 made by Cannon Inc.) and recording was conducted on plain paper using the ink jet printer.

The ink-jet ink responsive to pH change stimulation was evaluated.

In the printing using this ink-jet ink, a 5 wt % aqueous polyacrylic acid solution of pH 2 was first sprayed onto plain paper as a recording medium to prepare a recording medium capable of giving stimulation. Ink jet recording was conducted on this medium as described above. After 30 seconds, the printed area was pressed hard with a finger, but no ink adhered to the finger.

When the ink composition and the 5 wt % aqueous polyacrylic acid solution of pH 2 were mixed, formation of blue gel was occurred immediately.

Comparative Example 9

Using the ink originally provided in the ink jet printer (BJF800 made by Cannon Inc.) used in Example 20, blue color printing was conducted on the recording medium of Example 20. After 30 seconds, the printed area was pressed hard with a finger and the ink adhered to the finger. cl Example 21

<Synthesis of Block Polymer>

Synthesis of Block Polymer Comprised of 2-ethoxyethyl Vinyl Ether (EOVE), 2-methoxyethyl Vinyl Ether (MOVE) and HO(CH$_2$)$_5$COOH, having a Free Carboxylic Acid at one End Poly[EOVE(2-ethoxyethyl vinyl ether)-b-MOVE (methoxyethyl vinyl ether)]—O(CH$_2$)$_5$COOH (b denotes that the polymer is a block polymer) was synthesized by the following procedure.

The atmosphere in a glass container equipped with a three-way stopcock was replaced with nitrogen, and the glass container was heated to 250° C. under nitrogen atmosphere to remove adsorbed water. After cooling the system to room temperature, 12 mmol of EOVE, 16 mmol of ethyl acetate, 0.1 mmol of 1-isobutoxyethyl acetate and 11 ml of toluene were added, and the system was cooled. When the temperature of the system reached 0° C., 0.2 mmol of ethyl aluminum sesquichloride (an equimolar mixture of diethyl aluminum chloride and ethyl aluminum dichloride) was added to initiate polymerization. The molecular weight was monitored with time using molecular sieve column chromatography (GPC) to confirm the completion of polymerization of the component A (EOVE).

12 mmol of component B (MOVE) was added and polymerization was conducted. After confirming the completion of polymerization of the component B by GPC monitoring, the polymerization reaction was stopped by addition of 30 mmol of HO(CH$_2$)$_5$COOEt. The reaction mixture was diluted with dichloromethane, washed with 0.6 M hydrochloric acid three times and with distilled water three times. The obtained organic layer was concentrated to dryness on an evaporator to obtain a block polymer of poly[EOVE-b-MOVE]—O(CH$_2$)$_5$COOEt).

In particular, the terminal portion was identified by the confirmation of the existence of terminal in the spectrum of the polymer according to a measurement by the DOSY method in NMR. Mn was $2.1 \times 10^4$ and Mw/Mn was 1.4. Mn means number average molecular weight and Mw means weight average molecular weight.

The ester moiety at the terminal of the obtained poly [EOVE-b-MOVE]-O(CH$_2$)$_5$COOEt was hydrolyzed and identified by NMR. The objective poly[EOVE-b-MOVE]—O(CH$_2$)$_5$COOH was obtained.

26 parts by weight of the obtained block polymer having a carboxylic acid terminus and 200 parts by weight of an aqueous sodium hydroxide solution of pH 11 were stirred at 0° C. for three days to prepare a sodium carboxylate polymer solution in which the polymer has been completely dissolved. The polymer was extracted with methylene chloride, dried and then isolated by evaporating the solvent. Subsequently, 97 parts by weight of ion exchange water was added to 4 parts by weight of the polymer and the block polymer was dissolved at 0° C. by using a homogenizer.

Then, 30 parts by weight. of yellow oil-soluble dye (product name Yellow 129, available from Orient Chemical Industries, Ltd.) was dissolved in 70 parts by weight of toluene. 20 parts of this liquid coloring material was added to 65 parts by weight of an aqueous solution of the above-mentioned block polymer. After dispersing and mixing by using a homogenizer at 0° C., the temperature of the mixture was raised to 25° C. to form micelles of the block polymer including the liquid coloring material. Lastly, 10 parts by weight of diethylene glycol and 5 parts by weight of 2-pyrrolidone were added and mixed using a homogenizer. Coarse particles were removed by filtering to prepare the aqueous ink composition of the present invention. The inclusion state of the liquid coloring material was confirmed by observation using an electron microscope.

When 0.1 N hydrochloric acid was added dropwise to the aqueous ink composition to acidify the solution, yellow aggregate was generated, which indicated that the composition was responsive to stimulation.

Example 22

The 0.1 N hydrochloric acid solution described in Example 21 was sprayed on plain paper in advance. The aqueous ink composition prepared in Example 21 was ejected on the paper to conduct recording.

One minute after ejection of the aqueous ink composition, another white plain paper was pressed to the printed area at a load of $4.9 \times 10^4$ N/m$^2$ and the fixing strength was evaluated by examining whether the ink attached to the white plain paper. No ink attached to the white plain paper. The same test was repeated five times and the same results were obtained.

Comparative Example 10

6 parts by weight of a yellow oil soluble dye (product name Yellow 129, available from Orient Chemical Industries, Ltd.) was dissolved in 94 parts by weight of toluene, with which printing and fixing strength were evaluated in the same manner as in Example 22. The ink attached to the white plain paper.

Example 23 and Comparative Example 11

Weather-resistance was evaluated by using the printed matter prepared in Example 22 and Comparative Example 10. The weather-resistance evaluation was conducted by exposing the printed matter to sunlight through a window facing south and observing the color change of the printed sample. As a result, color fading was more remarkable in the printed matter of Comparative Example 10 than that of Example 22.

Example 24

<Synthesis of Block Polymer>

Synthesis of Block Polymer Comprised of 2-ethoxyethyl Vinyl Ether (EOVE), 2-methoxyethyl Vinyl Ether (MOVE) and HO(CH$_2$)$_5$COOH, having a Free Carboxylic Acid at One End Poly[EOVE(2-ethoxyethyl vinyl ether)-b-MOVE (methoxyethyl vinyl ether)]—O(CH$_2$)$_5$COOH (b denotes that the polymer is a block polymer) was synthesized by the following procedure.

The atmosphere in a glass container equipped with a three-way stopcock was replaced with nitrogen, and the glass container was heated to 250° C. under nitrogen atmosphere to remove adsorbed water. After cooling the system to room temperature, 12 mmol of EOVE, 16 mmol of ethyl acetate, 0.1 mmol of 1-isobutoxyethyl acetate and 11 ml of toluene were added, and the system was cooled. When the temperature of the system reached 0° C., 0.2 mmol of ethyl aluminum sesquichloride (an equimolar mixture of diethyl aluminum chloride and ethyl aluminum dichloride) was added to initiate polymerization. The molecular weight was monitored with time using molecular sieve column chromatography (GPC) to confirm the completion of polymerization of the component A (EOVE). 12 mmol of component B (MOVE) was added and polymerization was conducted. After confirming the completion of polymerization of the component B by GPC monitoring, the polymerization reaction was stopped by addition of 30 mmol of HO(CH$_2$)$_5$COOEt. The reaction mixture was diluted with dichloromethane, washed with 0.6 M hydrochloric acid three times and with distilled water three times. The obtained organic layer was concentrated to dryness on an evaporator to obtain a block polymer of poly[EOVE-b-MOVE]—O(CH$_2$)$_5$COOEt).

In particular, the terminal portion was identified by the confirmation of the existence of terminal in. the spectrum of the polymer according to a measurement by the DOSY method in NMR. Mn was $2.1 \times 10^4$ and Mw/Mn was 1.4. Mn means number average molecular weight and Mw means weight average molecular weight.

The ester moiety at the terminal of the obtained poly [EOVE-b-MOVE]-O(CH$_2$)$_5$COOEt was hydrolyzed and identified by NMR. The objective poly[EOVE-b-MOVE]—O(CH$_2$)$_5$COOH was obtained.

26 parts by weight of the obtained block polymer having a carboxylic acid terminus and 200 parts by weight of an aqueous sodium hydroxide solution of pH 11 were stirred at 0° C. for three days to prepare a sodium carboxylate polymer solution in which the polymer has been completely dissolved. The polymer was extracted with methylene chloride,. dried and then isolated by evaporating the solvent. Subsequently, 97 parts by weight of ion exchange water was added to 4 parts by weight of the polymer and the block polymer was dissolved at 0° C. by using a homogenizer.

Then, 30 parts by weight of black oil-soluble dye (product name Black 860, available from Orient Chemical Industries, Ltd.) was dissolved in 70 parts by weight of toluene. 20 parts of this liquid coloring material was added to 65 parts by weight of an aqueous solution of the above-mentioned block polymer. After dispersing and mixing by using a homogenizer at 0° C., the temperature of the mixture was raised to 25° C. to form micelles of the block polymer including the liquid coloring material. Lastly, 10 parts by weight of diethylene glycol and 5 parts by weight of 2-pyrrolidone were added and mixed using a homogenizer. Coarse particles were removed by filtering to prepare the aqueous ink composition of the present invention. The inclusion state of the liquid coloring material was confirmed by observation using an electron microscope.

When 0.1 N hydrochloric acid was added dropwise to the aqueous ink composition to acidify the solution, black aggregate was generated, which indicated that the composition was responsive to stimulation.

Example 25

The 0.1 N hydrochloric acid solution described in Example 24 was sprayed on plain paper in advance. The aqueous ink composition prepared in Example 24 was ejected on the paper to conduct recording.

One minute after ejection of the aqueous ink composition, another white plain paper was pressed to the printed area at a load of $4.9 \times 10^4$ N/m$^2$ and the fixing strength was evaluated by examining whether the ink attached to the white plain paper. No ink attached to the white plain paper. The same test was repeated five times and the same results were obtained.

Comparative Example 12

6 parts by weight of a black oil soluble dye (product name Black 860, available from Orient Chemical Industries, Ltd.) was dissolved in 94 parts by weight of toluene and printing and fixing strength were evaluated in the same manner as in Example 25. The ink adhered to the white plain paper.

Example 26 and Comparative Example 13

Weather-resistance was evaluated by using the printed matter prepared in Example 25 and Comparative Example 12.

The weather-resistance evaluation was conducted by exposing the printed matter to sunlight through a window facing south and observing the color change of the printed sample. As a result, color fading was more remarkable in the printed matter of Comparative Example 12 than that of Example 25.

As described above, the present invention can provide a dispersion composition containing a functional substance in which the functional substance and a block polymer are highly dispersed in a solvent in the form of particles.

The present invention can also provide an ink composition containing a pigment or a dye as a functional substance and water as a solvent, in which dispersibility of the pigment and the dye is superior.

In addition, the present invention can provide an ink composition for ink jet having high dispersion stability of pigment or dye, which is a functional substance, in a solvent, and having superior color and color development of printed image.

Furthermore, the present invention aims at providing a method of forming an image capable of forming a printed image superior in fixing property, and an image forming apparatus used therefor, using the above-mentioned ink composition.

This application claims priority from Japanese Patent Applications No. 2002-061066 filed Mar. 6, 2002, No. 2002-169823 filed Jun. 11, 2002, No. 2002-169824 filed Jun. 11, 2002 and No. 2002-364226 filed Dec. 16, 2002, which are hereby incorporated by reference herein.

What is claimed is:

1. A composition in which a functional substance is dispersed,
   wherein the functional substance and a block polymer are dispersed in a solvent in the form of particles, and
   the particles have an average particle size of not more than 70 nm and a particle size distribution represented by an index of dispersion degree $\mu/G^2$ of not more than 0.2.

2. The composition according to claim 1, wherein the particle size distribution represented by an index of dispersion degree $\mu/G2$ is not more than 0.1.

3. The composition according to claim 1, wherein the particles are in the form of polymer micelles comprising the block polymer including the functional substance.

4. The composition according to claim 3, wherein the block polymer constituting the polymer micelles is an amphiphilic block polymer.

5. The composition according to claim 1, wherein the block polymer is a nonionic amphiphilic block polymer.

6. The composition according to claim 1, wherein the block polymer is an ionic amphiphilic block polymer.

7. The composition according to claim 1, wherein the block polymer has a repeating structural unit of the following formula (1):

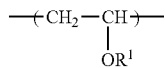

wherein $R^1$ is selected from the group consisting of a linear, branched or cyclic alkyl 2 group having 1 to 18 carbon atoms, Ph, Pyr, Ph-Ph, Ph-Pyr, —(CH($R^3$)—CH($R^3$)—O)$_p$—$R^4$ and —(CH$_2$)$_m$—(O)$_n$—$R^4$, in which the hydrogen atom in the aromatic ring is substituted or not substituted by a linear or branched alkyl group having 1 to 4 carbon atoms and the carbon atom in the aromatic ring is unsubstituted or substituted with a nitrogen atom, p is an integer of 1 to 18, m is an integer of 1 to 36, n is 0 or 1, each of $R^2$ and $R^3$ is independently a hydrogen atom or CH$_3$, $R^4$ is a hydrogen atom, a linear, branched or cyclic alkyl group having 1 to 18 carbon atoms, Ph, Pyr, Ph-Ph, Ph-Pyr, —CHO, —CO—CH=CH$_2$, —CO—C(CH$_3$)=CH$_2$, or —CH$_2$COOR$^7$, and when $R^4$ is other than a hydrogen atom, a hydrogen atom bonded to a carbon atom is not replaced or replaced by a linear or branched alkyl group having 1 to 4 carbon atoms, F, Cl or Br, and the carbon atom in the aromatic ring is not replaced or replaced by a nitrogen atom, and $R^7$ is a hydrogen atom or an alkyl group having 1 to 4 carbon atoms.

8. The composition according to claim 1, wherein the block polymer has a repeating structural unit of the following formula (2) as a hydrophilic segment:

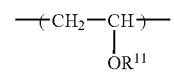

wherein $R^{11}$ is —(CH($R^2$)—CH($R^3$)—O)$_p$—$R^{14}$ or —(CH$_2$)m—(O)$_n$—$R^{14}$, p is an integer of 1 to 18, m is an integer of 1 to 36, n is 0 or 1, each of $R^2$ and $R^3$ is independently a hydrogen atom or CH$_3$, and $R^{14}$ is a hydrogen atom or an alkyl group having 1 to 5 carbon atoms.

9. The composition according to claim 1, wherein the block polymer has a molecular weight distribution (weight average molecular weight (Mw)/number average molecular weight (Mn)) of not more than 2.0.

10. The composition according to claim 1, wherein the block polymer has a glass transition temperature Tg of not more than 20° C.

11. The composition according to claim 1, wherein the functional substance is a coloring material.

12. A method of forming an image by applying ink on a recording medium,
    wherein the ink is a composition in which a functional substance is dispersed, wherein the functional substance and a block polymer are dispersed in a solvent in a form of integrated particles, and
    the particles have an average particle size of not more than 70 nm and a particle size distribution represented by an index of dispersion degree $\mu G^2$ of not more than 0.2.

13. The method according to claim 12, wherein the ink is applied by supplying thermal energy.

14. The composition according to claim 1, wherein the composition has a pH of not less than 5 and contains a cation.

15. The method according to claim 12, which comprises contacting the ink with a recording medium which has, on its surface, a stimulating substance that stimulates the ink, whereby the ink is fixed on the recording medium to form an image.

16. A recording medium on which an image is formed by applying an ink,
    wherein the ink is a composition in which a functional substance is dispersed, wherein the functional substance and a block polymer are dispersed in a solvent in a form of integrated particles, the particles have an average particle size of not more than 70 nm and a particle size distribution represented by an index of dispersion degree $\mu/G^2$ of not more than 0.2, and the recording medium has, on its surface, a stimulating substance which stimulates the ink.

* * * * *